(12) United States Patent
Tengvall et al.

(10) Patent No.: US 11,672,331 B2
(45) Date of Patent: Jun. 13, 2023

(54) METHOD OF BUNDLING BRISTLES TO BE USED IN PAINT BRUSHES, A PAINT BRUSH HEAD COMPRISING A PLURALITY OF BRISTLES AND A PAINT BRUSH COMPRISING A PLURALITY OF BRISTLES AND/OR A PAINT BRUSH HEAD

(71) Applicant: ORKLA HOUSE CARE AB, Bankeryd (SE)

(72) Inventors: Thomas Tengvall, Habo (SE); Dorge Lundberg, Mullsjö (SE); Kåre Johansson, Fristad (SE)

(73) Assignee: ORKLA HOUSE CARE AB

( * ) Notice: Subject to any disclaimer, the term of this patent is extended or adjusted under 35 U.S.C. 154(b) by 776 days.

(21) Appl. No.: 16/492,244

(22) PCT Filed: Feb. 13, 2018

(86) PCT No.: PCT/SE2018/050132
§ 371 (c)(1),
(2) Date: Sep. 9, 2019

(87) PCT Pub. No.: WO2018/169464
PCT Pub. Date: Sep. 20, 2018

(65) Prior Publication Data
US 2020/0037751 A1 Feb. 6, 2020

(30) Foreign Application Priority Data
Mar. 13, 2017 (SE) .................................. 1750280-8

(51) Int. Cl.
*A46D 1/00* (2006.01)
*A46B 3/12* (2006.01)
(Continued)

(52) U.S. Cl.
CPC .............. *A46D 1/0269* (2013.01); *A46B 3/12* (2013.01); *A46B 2200/202* (2013.01);
(Continued)

(58) Field of Classification Search
CPC ..... A46B 3/005; A46B 3/04; A46B 2200/202; A46D 1/0269; A46D 3/00; A46D 3/005; A46D 3/06
(Continued)

(56) References Cited

U.S. PATENT DOCUMENTS 4,441,227 A * 4/1984 d'Argembeau ..... B29C 65/1654
15/207.2
4,592,594 A 6/1986 D'argembeau
(Continued)

FOREIGN PATENT DOCUMENTS

CN 204838455 A 12/2015
CN 105496002 4/2016
(Continued)

OTHER PUBLICATIONS

International Search Report and Written Opinion for corresponding International Application No. PCT/SE2018/050132 dated Apr. 24, 2018.
(Continued)

*Primary Examiner* — Michael D Jennings
*Assistant Examiner* — Aaron R McConnell
(74) *Attorney, Agent, or Firm* — McDonald Hopkins LLC

(57) ABSTRACT

The present invention concerns a method of bundling a plurality of monofilaments into a bundle of monofilaments by means of a laser, a paint brush head including such bundle of monofilaments and a paint brush including such paint brush head.

14 Claims, 4 Drawing Sheets

(51) Int. Cl.
  *B29C 65/16* (2006.01)
  *B29C 65/00* (2006.01)
  *B29L 31/42* (2006.01)

(52) U.S. Cl.
  CPC ............. *B29C 65/16* (2013.01); *B29C 66/69* (2013.01); *B29L 2031/42* (2013.01)

(58) Field of Classification Search
  USPC .......................................... 300/21; 15/159.1
  See application file for complete search history.

(56) References Cited

U.S. PATENT DOCUMENTS

| | | | |
|---|---|---|---|
| 4,697,851 | A | 10/1987 | Takahashi |
| 5,084,932 | A | 2/1992 | Winger |
| 6,500,296 | B1 | 12/2002 | Weihrauch |
| 2002/0004963 | A1* | 1/2002 | Woodnorth ............. A46B 3/12 15/160 |
| 2004/0074034 | A1* | 4/2004 | Russell .................... A46B 3/06 15/167.1 |
| 2008/0224528 | A1 | 9/2008 | Wang |
| 2011/0023249 | A1* | 2/2011 | Boucherie ................ A46B 3/06 15/171 |
| 2012/0023692 | A1 | 2/2012 | Boucherie |

FOREIGN PATENT DOCUMENTS

| | | |
|---|---|---|
| DE | 10310902 B4 | 11/2005 |
| DE | 102009007460 | 8/2010 |
| EP | 1153555 | 4/2001 |
| TW | M298926 A | 10/2006 |

OTHER PUBLICATIONS

Swedish Office Action Report for priority Swedish Application No. 1750280-2 dated Oct. 3, 2017.

Extended European Search Report for Application 18766746.4, PCT/SE2018/050132, dated Dec. 4, 2020, 9 pgs., European Patent Office, Germany.

* cited by examiner

METHOD OF BUNDLING BRISTLES TO BE USED IN PAINT BRUSHES, A PAINT BRUSH HEAD COMPRISING A PLURALITY OF BRISTLES AND A PAINT BRUSH COMPRISING A PLURALITY OF BRISTLES AND/OR A PAINT BRUSH HEAD

This application is a national phase of International Application No. PCT/SE2018/050132 filed Feb. 13, 2018 and published in the English language, which claims priority to Swedish Application No. 1750280-8 filed Mar. 13, 2017, both of which are hereby incorporated by reference.

TECHNICAL FIELD

The present invention relates to a method of bundling a plurality of bristles to be used in paint brushes, a paint brush head comprising such a bundle of bristles and a paint brush comprising such a bundle of bristles and/or paint brush head.

BACKGROUND ART

Paint brushes are usually made of bristles, wherein the bristles form a bristle pack, which is able to hold therein a paint by adhesion as well as capillary forces.

Bristles may be natural or synthetic filaments, wherein synthetic filaments, i.e. monofilaments, can be produced from a wide variety of thermoplastic polymers, in a wide variety of configurations including solid and hollow, and in a wide variety of cross-sections, including circular, oval, triangular, trilocular, tetralocular, lobate, or may contain multiple voids.

It is commonly known to use a metal ferrule and an adhesive for connecting the bristles to become a bristle pack and the bristle pack to the ferrule and a paint brush handle. This is conventionally done by inserting one end of the bristle pack into the ferrule and then applying the adhesive against the end of the bristle pack inside the ferrule. Usually an epoxy adhesive is used, wherein it is commonly known that epoxy resins in their liquid and uncured state are mostly classed as irritant to the eyes and skin, as well as toxic to aquatic organisms. Exposure to epoxy resins can, over time, induce an allergic reaction. Sensitization generally occurs due to repeated exposure (e.g. through poor working hygiene and/or lack of protective equipment) over a long period of time.

Furthermore the epoxy adhesives used for paint brush manufacturing is known to have a long curing time, usually several hours.

SUMMARY OF THE INVENTION

It is, accordingly, an object of the present invention to overcome deficiencies of the prior art, such as indicated above.

It is another object to provide an alternative method of bundling bristles to be used in paint brushes without exposing the manufacturing staff to toxic adhesives.

It is yet another object to provide an alternative method of bundling bristles to be used in paint brushes wherein the overall manufacturing time is reduced.

Still another object is to provide an alternative method of bundling bristles to be used in paint brushes wherein the effort and messy/mucky job of handling, using and applying a sticky fluidic adhesive is reduced.

It is even yet another object to provide an alternative method of bundling bristles to be used in paint brushes wherein the bundling is performed before the bristles or monofilaments is made into a paint brush head, i.e. inserted into a bristle carrier.

It is a further object of the present invention to provide an interchangeable paint brush head and a paint brush handle configured to be used with such paint brush head.

According to the invention is provided a method of bundling a plurality of bristles or monofilaments configured to be used in paint brushes by; gathering a predefined number of monofilaments or bristles into a group or bundle of bristles/monofilaments so that the bristles or monofilaments are tangent to each other along their length, aligning the bristles or monofilaments at one end of the bristles/monofilaments obtaining a flush end surface and fusing the one end of the bristles/monofilaments together by means of a laser into a joined bundle of bristles or monofilaments.

Hereby is provided an alternative way of bundling a group of bristles/monofilaments, wherein the bundling is performed before the group of bristles/monofilaments is inserted into a bristle carrier. Furthermore is provided a non-toxic bundling method wherein the overall manufacturing time of manufacturing a paint brush is reduced since one don't need to wait for any chemical curing process.

In the context of the present invention under the term "monofilament" there is understood an elongated flexible body having a first end and a second end, i.e. a bristle. The first end, i.e. the one end, is part of a root section where the bristle or monofilament is contained in, held and/or fastened in the bristle carrier. The second end of the bristle or monofilament forms a free tip which usually contacts a surface to be coated with paint. The second end is part of the tip section of the bristle/monofilament.

The plurality of bristles/monofilaments may include solid and/or hollow bristles or monofilaments and have a wide variety of cross-sections, including circular, oval, triangular, trilocular, tetralocular, lobate, etc., and/or may be corrugated, contain multiple voids or have any other type of uneven surface.

The plurality of bristles/monofilaments may be made from any suitable thermoplastic polymer, including polyamides, polyesters and/or polyolefins.

The plurality of bristles/monofilaments may be a mix of different types of monofilaments, e.g. having different lengths and/or different diameters and/or be made of different materials. By "diameter" throughout this application is meant the average diameter of the bristle or monofilament or in general the maximum cross-sectional dimension of the bristle or monofilament.

The gathering of bristles/monofilaments into a group may be provided by the use of a holder circumventing or otherwise holding the group of bristles/monofilaments and forming the group of bristles/monofilaments into a predefined shape by known methods.

The flush end surface may be a flat surface, a curved or staggered surface or have any other suitable shape.

The laser source may be controlled to fuse the one end of the plurality of bristles/monofilaments together by means of heat produced by the laser beam. This is done by arranging the group of bristles/monofilaments so they are submitted to the action/energy of the laser beam. The energy of the laser source is applied to at least part of the area of the one end of the plurality of bristles/monofilaments or applied to the whole area of the one end of the plurality of bristles/monofilaments. The energy of the laser source is distributed over at least a part of the area of the one end of the plurality of bristles/monofilaments and then spread over the remaining area. The laser source is applied to heat an area evenly for a uniform fusing of the one end of the plurality of bristles/monofilaments.

The temperature applied by the laser may preferably be sufficient to melt the one end of the plurality of bristles/monofilaments together and to provide a strong and at the same time flexible or supple or soft smelt/fuse when fusing the one end of the plurality of bristles/monofilaments together, whereas the temperature is kept at an optimised level as a too high temperature during the fusing may provide a porous and brittle smelt or fuse.

In one aspect of the invention the fusing by means of the laser is performed by moving the laser in a predefined pattern that is configured to distribute the heating of the one end of the bristles/monofilaments equally.

The pattern may cross itself such that heating is applied to a part of the end surface of the bristles/monofilaments more than one time.

Hereby is provided a relative movement between the ends of the bristles/monofilaments and the laser beam, so that the beam sweep across the whole end surface provided with bristles/monofilaments, preferably more than once, where the heat is distributed such that the one end of the bristles/monofilaments is not burned off but only melted together into a joined end.

In another aspect of the invention the fusing by means of the laser is performed by the laser being out of focus.

One or more lenses may be used to have the laser beam out of focus.

Hereby is provided an alternative and/or supplementary way of distributing the heating from the laser such that the one end of the bristles/monofilaments is not burned off but only melted and joined together.

Hence, it is provided an alternative and/or supplementary way of distributing the heating from the laser such that the one end of the bristles/monofilaments is not burned off but only melted together with the other bristle/monofilament ends, at least the closest ones uniting the bristles/monofilaments into a continuous merging of the whole end surface provided with bristles/monofilaments.

In yet another aspect of the invention the method further comprises fusing the one end of the bundle of bristles/monofilaments to a polymer bristle carrier.

The polymer bristle carrier may be made from any suitable thermoplastic polymer, including polyamides, polyesters and/or polyolefins.

The polymer bristle carrier may be suitable for receiving the bundle of bristles/monofilaments through a first opening. The bundle of bristles/monofilaments may be fused to an inside surface of the polymer bristle carrier by applying heat through a second opening opposite the first opening. The polymer bristle carrier may be a polymer ferrule.

In one aspect of the invention the method further comprises fusing the outer periphery of the one end of the bundle of bristles/monofilaments to the polymer bristle carrier.

Hereby is provided a weld line between the bundle of bristles/monofilaments and the polymer bristle carrier, assembling the two parts into one part, i.e. a paint brush head.

In another aspect of the invention the method further comprises melting extra material comprised in the polymer bristle carrier, e.g. at its inside and/or as a circumferential bulb of extra material, such that the extra material make up an additional fusing layer and/or volume and/or area for extra/denser coverage and fusage of at least partly the end surface of the plurality of bristles/monofilaments. This "extra" material is melted and "adds" more material to the smelt/fuse when fusing the one end of the plurality of bristles/monofilaments together.

The above fusing layer may be a mixture of the extra material from the polymer bristle carrier and the plurality of monofilaments. The fusing layer may cover the whole end surface of the plurality of bristles/monofilaments. The extra material may be melted by means of the laser. The "extra" material may in some aspects be added by letting the insert protrude a certain distance above the plurality of monofilaments, which added material as part of the exposed "top" of the insert then melts and coalesce (is fused) with the lower standing monofilaments.

The plurality of monofilaments and the polymer bristle carrier may hereby be fused together in one and the same step. Hence, the plurality of bristles/monofilaments and/or insert and/or bristle carrier are joined by being fused together at once.

In yet another aspect of the invention the method further comprises fusing the one end of the bundle of bristles/monofilaments to at least a part of a polymer insert.

At least a part of the outer periphery of the polymer insert may be fused together with the adjacent bristles/monofilaments. A weld line may be created between the polymer insert and the adjacent bristles/monofilaments.

The polymer insert may be made from a foam or rubber material, such as polyester. The polymer insert may be made from any suitable thermoplastic polymer, including polyamides, polyesters and/or polyolefins.

The polymer insert may be arranged centrally in the bundle of bristles/monofilaments. The polymer insert may be used for creating a cavity within the bundle of bristles/monofilaments configured for storing an amount of paint.

Hereby is provided a weld line between the bundle of bristles/monofilaments and at least one polymer insert, assembling the two parts into one part, i.e. a bundle of bristles/monofilaments comprising a polymer insert.

In one aspect of the invention the method further comprises arranging the polymer insert such that a portion of the polymer insert protrudes from the end surface of the plurality of bristles/monofilaments and melting the protruding portion of the polymer insert such that the protruding portion of the polymer insert make up a fusing layer covering at least partly the end surface of the plurality of bristles/monofilaments.

The fusing layer may be a mixture of the polymer insert and the plurality of monofilaments. The fusing layer may cover the whole end surface of the plurality of bristles/monofilaments.

The plurality of monofilaments and the polymer insert may hereby be fused together in one method step. The protruding portion of the polymer insert may be melted by means of the laser.

The fusing layer may comprise a mixture of the extra material from the polymer bristle carrier, the protruding portion of the polymer insert and the plurality of monofilaments. Hereby the polymer bristle carrier, the polymer insert and the plurality of monofilaments may be fused together in one method step.

In another aspect of the invention the plurality of bristles/monofilaments and/or polymer bristle carrier and/or polymer insert is/are made of polyester.

The bristles/monofilaments, the polymer bristle carrier and the polymer insert may be made from the same material, such as polyester. In this case the bristle/monofilaments, the polymer bristle carrier and the polymer insert have uniform thermal properties, i.e. melt and solidify at the same temperatures.

The invention also relates to a paint brush head comprising a bundle of bristles or monofilaments and a polymer bristle carrier obtained by the method as described above.

The bundle of bristles/monofilaments may be detachably attached to the polymer bristle carrier.

In one aspect of the invention the bundle of bristles/monofilaments and the polymer bristle carrier is fused together.

In another aspect of the invention the polymer bristle carrier is detachably attached to a paint brush handle.

The attachment of the polymer bristle carrier to the paint brush handle may be provided by means of snap-fit connection means, pivoting connection means, sliding connection means or any other suitable connection means.

Hereby is provided an interchangeable paint brush head configured to be used with a corresponding paint brush handle. Furthermore a paint brush head is provided without the use of toxic adhesives and wherein the overall manufacturing time is reduced.

The invention also relates to a paint brush comprising a bundle of bristles/monofilaments obtained by the method described above and/or a paint brush head as described above.

Hereby is provided an interchangeable paint brush head and a paint brush handle configured to be used with such paint brush head. Furthermore a paint brush is provided without the use of toxic adhesives and wherein the overall manufacturing time is reduced.

BRIEF DESCRIPTION OF THE DRAWINGS

The invention will now be explained in further details with reference to the drawings showing an embodiment thereof.

DETAILED DESCRIPTION

Figure 1:
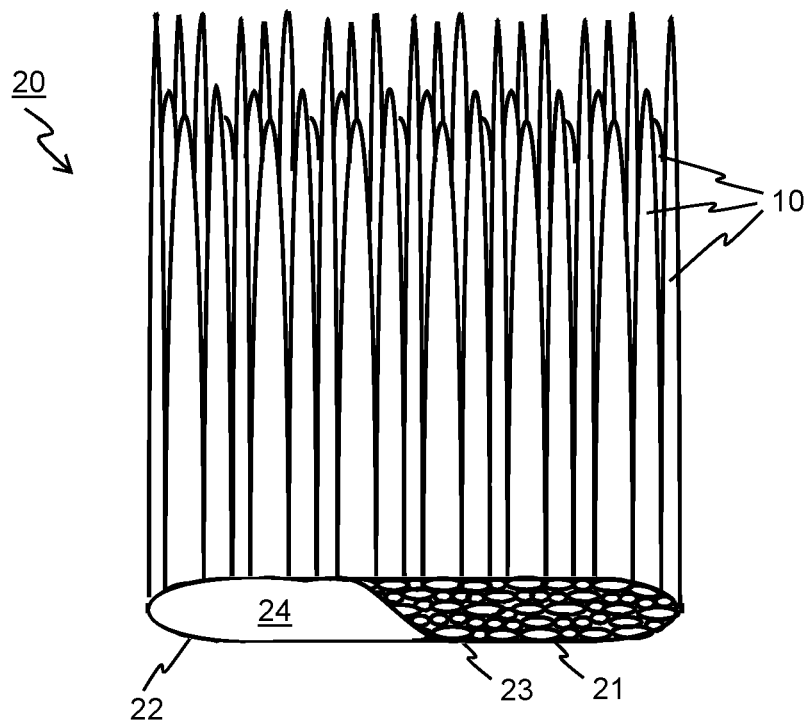
FIG. 1 shows a bundle of bristles/monofilaments according to the invention.

The invention relates to a bundle of bristles or monofilaments 20 being fused together at one end 21 of the bristles, i.e. a root end of the bristles, to be used together with a bristle carrier 31, optionally a polymer bristle carrier 31a, and a paint brush handle 41 in order to obtain a paint brush 40. The present invention also relates to a method of bundling a plurality of bristles 10 into a joined bundle 20 of bristles. Methods of mixing, forming and gathering individual bristles or monofilaments into a plurality of such ones in a bundle or tuft of bristles before connecting/fixing/attaching/joining the bristles to each other at one end are known in the art and not explained here.

Referring to FIG. 1, a bristle bundle 20 according to the invention is illustrated comprising a plurality of bristles 10 gathered into a group of bristles so that the bristles 10 are tangent to each other all along their length and aligned so that one end 21 of the bristles make up a flush end surface 23. The group of bristles 10 are shaped into a shape having a predefined outer periphery 22. The bundle of bristles 20 is further obtained by fusing C the one end 21 of the bristles 10 together by means of a laser (not shown) so that the end surface 23 becomes a continuous layer of melted and joined bristles 24.

Figure 3:
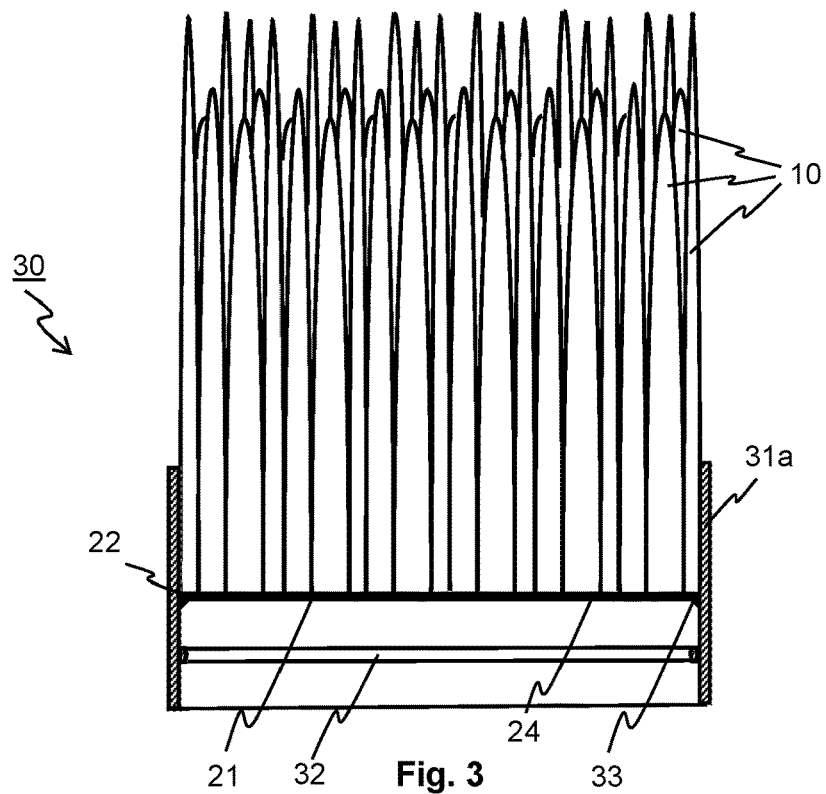
FIG. 3 shows a paint brush head comprising a polymer bristle carrier and optionally being interchangeable according to the invention.
Figure 4:
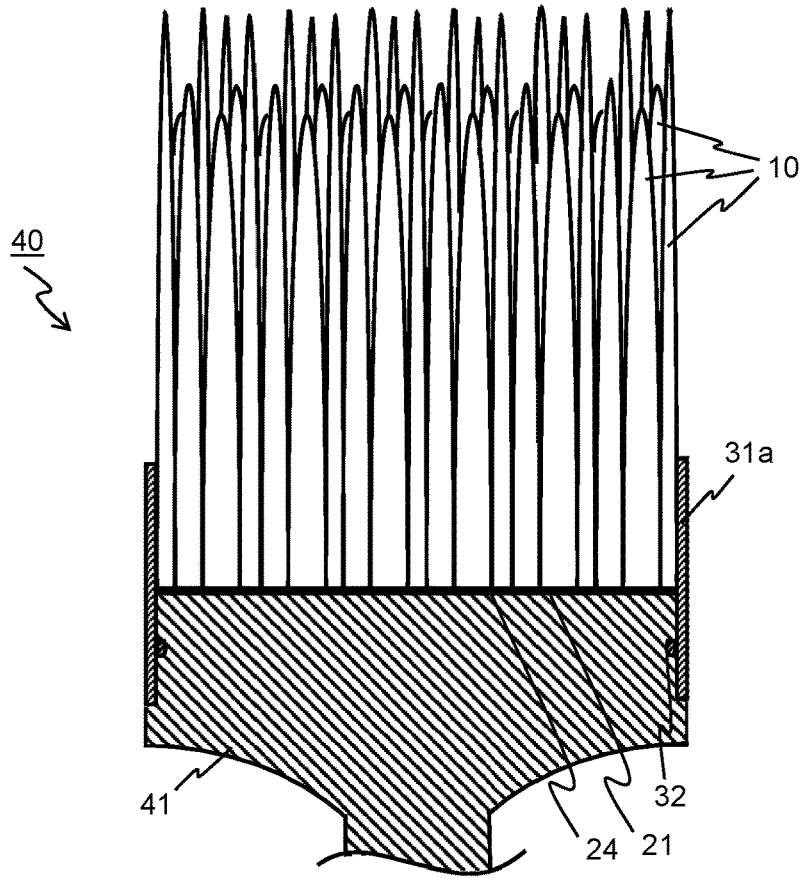
FIG. 4 shows a paint brush comprising an interchangeable paint brush head according to the invention.
Figure 6:
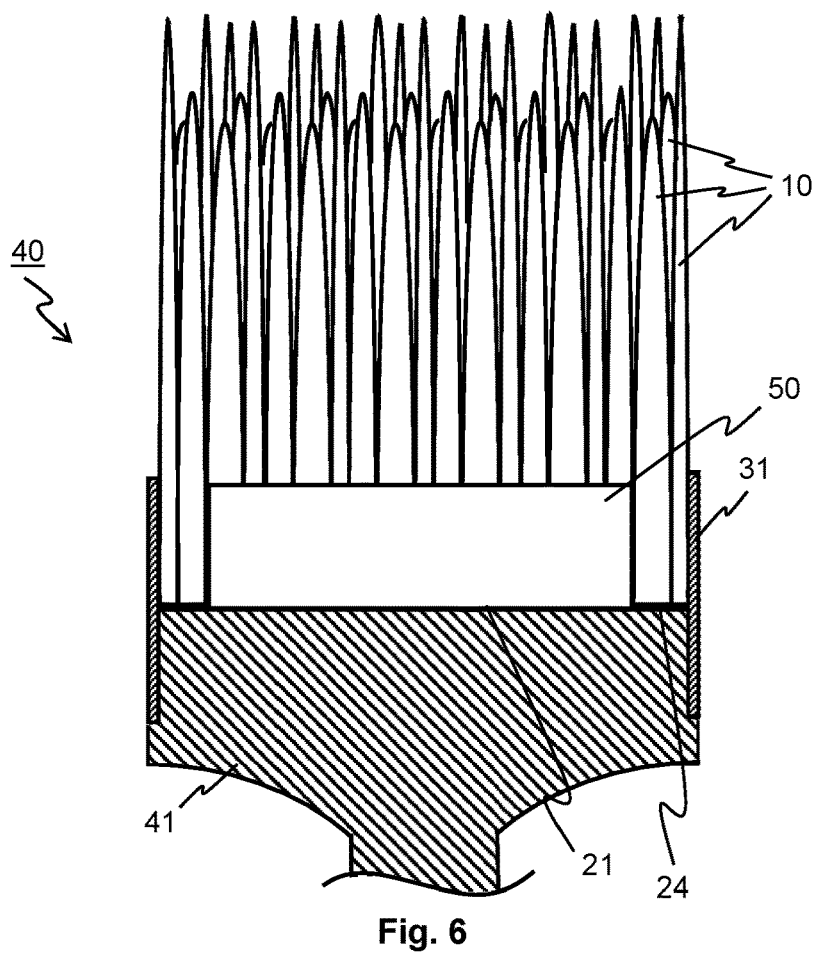
FIG. 6 shows a paint brush comprising the bundle of bristles/monofilaments comprising the polymer insert according to the invention.

The bundle 20 of bristles 10 may be configured for being attached to a paint brush handle 41 by means of a bristle carrier 31, i.e. a metal ferrule, and/or a polymer bristle carrier 31a, i.e. polymer ferrule, as shown in FIGS. 3, 4 and 6.

As illustrated by FIG. 1, the plurality of bristles 10 may comprise different types of bristles having different lengths and/or diameters and/or materials. Alternatively the plurality of bristles 10 may comprise only one type of bristles having the same length, diameter and/or material.

Figure 2:
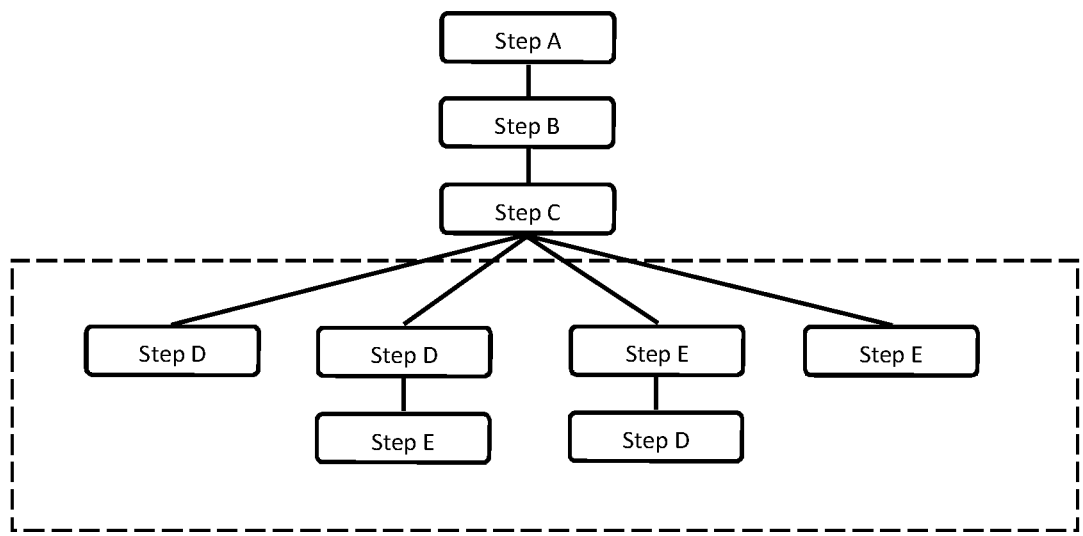
FIG. 2 shows steps of a method of bundling a plurality of bristles/monofilaments according to the invention.

Referring to FIG. 2, the steps A-D of a method of bundling a plurality of bristles 10 according to the invention is illustrated, wherein first step A comprises gathering a predefined number of bristles 10 into a group or bundle 20 of bristles so that the bristles 10 are tangent to each other all along their length.

The following step B comprises aligning the bristles 10 at one end 21 to obtain a flush end surface 23.

The following step C comprises fusing the one end 21 of the bristles 10 together by means of a laser into a joined bundle 20 of bristles.

Step D and E are both optional steps wherein one of them or both may be performed simultaneously with step C or after step C in any order. Step D comprises fusing the one end 21 of the bundle of bristles 20 to the polymer bristle carrier 31a. Step E comprises fusing the one end 21 of the bundle of bristles 20 to at least a part of a polymer insert 50.

Referring to FIG. 3, a paint brush head 30 according to the invention is illustrated wherein the paint brush head 30 comprises a bundle of bristles 20 obtained by the method steps A-C shown in FIG. 2 and is attached to the polymer bristle carrier 31a by the method step D shown in FIG. 2. When fusing the bundle of bristles 20 to an inside surface of the polymer bristle carrier 31a a weld line 33 may be created between the two parts.

The polymer bristle carrier 31a may comprise grooves, ridges or other suitable connection means 32 configured for fixing or detachable attaching the paint brush head 30 to a paint brush handle 41, as shown in FIG. 4. Hereby is provided a paint brush 40.

Figure 5:
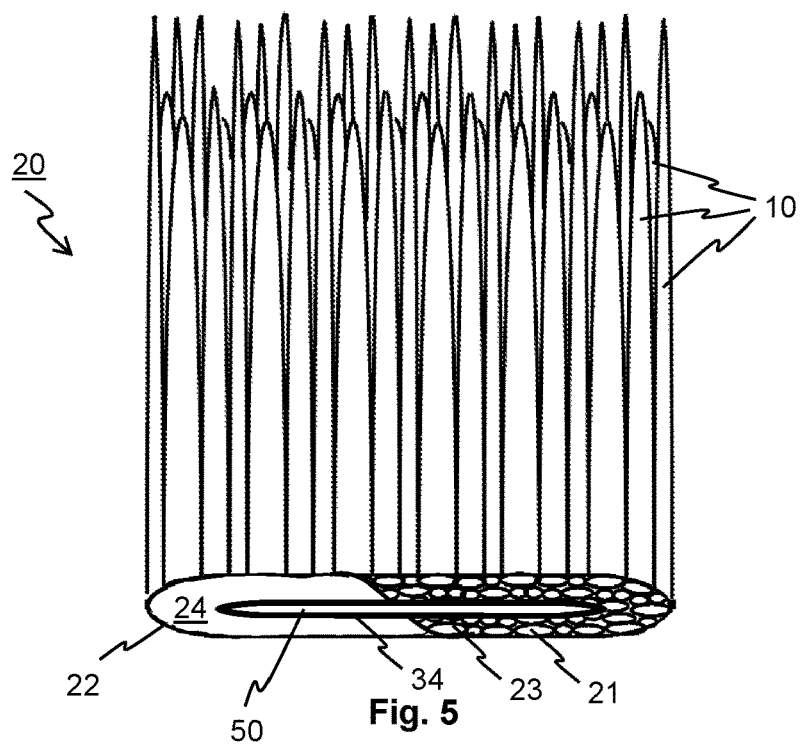
FIG. 5 shows a bundle of bristles/monofilaments comprising a polymer insert according to the invention.

Referring to FIGS. 5 and 6, a bundle 20 of bristles 10 comprising a polymer insert 50 and a paint brush 40 comprising such bundle of bristles 20 according to the invention is illustrated, wherein the polymer insert 50 is placed at the one end of the bristles 10 and extends along part of the length of the bristles 10. The polymer insert 50 is arranged such that the bristles 10 encircle the polymer insert 50. An end surface of the polymer insert 50 and the one end 21 of the bristles may together make up a flush end surface of the bundle 20 of bristles 10. When fusing the bristles 10 to for example an outer periphery of the polymer insert 50, a weld line 34 may be created between the polymer insert 50 and the adjacent bristles 10. Here, the bundle of bristles 20 forms an annular shaped volume around the insert 50 and between the polymer insert and the (polymer) bristle carrier or ferrule 31, 31*a*.

As shown in FIG. 6 the polymer insert 50 may extend a distance along the length of the bristles 10 corresponding to the length the (polymer) bristle carrier 31, 31*a* extends along the length of the bristles 10.

According to an aspect, the laser source is applied to heat an area evenly for a uniform fusing of the one end of the plurality of bristles/monofilaments 21.

The temperature applied by the laser may preferably be sufficient to melt the one end of the plurality of bristles/monofilaments 21 together and to provide a strong and at the same time flexible or supple or soft smelt/fuse when fusing the one end of the plurality of bristles/monofilaments 21 together, whereas the temperature is kept at an optimised level as a too high temperature during the fusing may provide a porous and brittle smelt or fuse.

According to an aspect the laser source is applied in one or more steps. In a first step the monofilaments are preheated, in a second step the monofilaments are starting to melt and in a third step the monofilaments are completely melted. According to one aspect the three steps are performed as one step. In one or more of the first, second and third step the lasers source is applied during a predetermined time. According to an aspect the laser source is applied in a pattern that runs back and forward over the monofilaments. According to an aspect the laser source is applied in a circular pattern over the monofilaments.

Figure 7A:
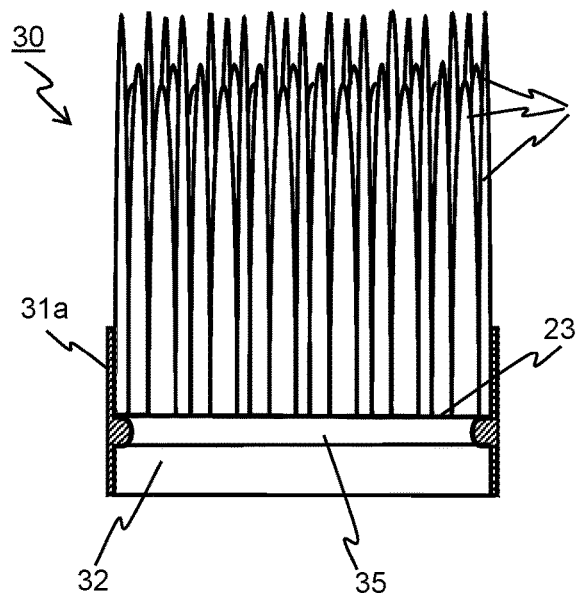
FIG. 7a-b show a paint brush head, wherein a polymer bristle carrier comprises extra material to be melted into a fusing layer.
Figure 7B:
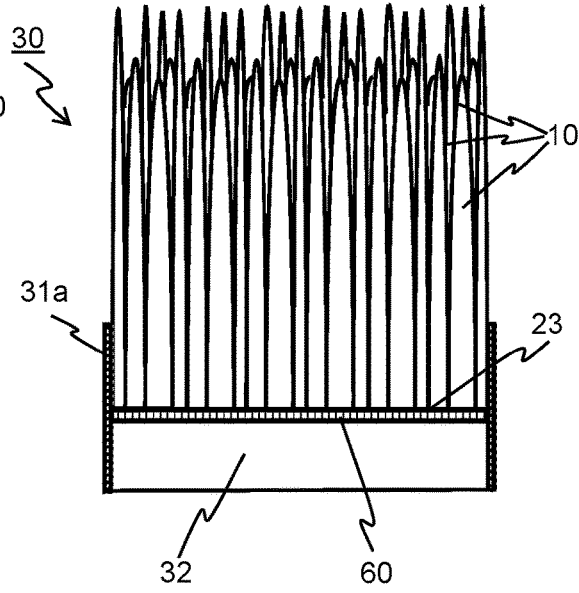

Referring to FIG. 7*a-b*, a paint brush head 30 according to the invention is illustrated, wherein the polymer bristle carrier 31*a* comprises extra material 35 arranged at least partly on the inside surface or as an circumferential edge partly or fully surrounding the inside surface of the polymer bristle carrier 31*a*. As shown on FIG. 7*a* the extra material 35 may be a protruding ridge extending along the entire circumference of the inner surface. The extra material 35 may be a plurality of continuous or discontinuous, i.e. separate protruding ridges (not shown). As shown on FIG. 7*b* the extra material 35 may be melted by means of the laser into a fusing layer 60 covering the end surface 23 of the plurality of bristles 10.

The plurality of bristles 10 and the polymer bristle carrier may hereby be fused together at once, i.e. in one method step.

Figure 8A:
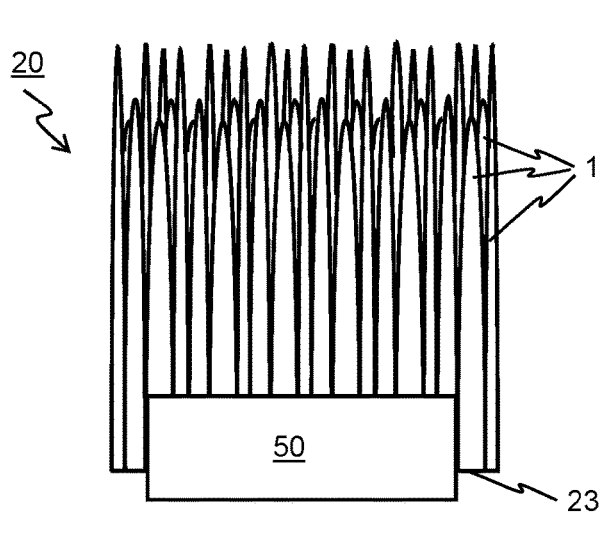
FIG. 8a-b show a bundle of bristles/monofilaments, wherein a protruding portion of a polymer insert is melted into a fusing layer.
Figure 8B:
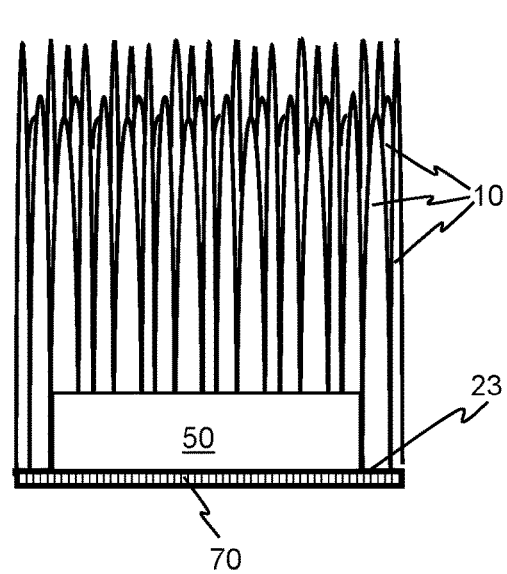

Referring to FIG. 8*a-b*, a bundle of bristles 20 according to the invention is illustrated. As shown in FIG. 8*a* the polymer insert 50 may be arranged such that a portion of the polymer insert 50 protrudes form the end surface 23 of the plurality of bristles 10. As shown on FIG. 8*b* the protruding portion of the polymer insert 50 may be melted by means of the laser into a fusing layer 70 covering the end surface 23 of the plurality of bristles 10.

The plurality of bristles and the polymer insert may hereby be fused together in one method step. The protruding portion of the polymer insert 50 may be melted by means of the laser.

The polymer insert 50 may be of a equilateral shape such that it is correctly orientated before and during the fusing process and does not end up askew relative to the surrounding parts making up the inventive paint brush and paint brush head.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method of bundling a plurality of monofilaments configured to be used in a paint brush comprising:
   gathering a predefined amount of monofilaments into a group of monofilaments so that the monofilaments are tangent to each other along their length,
   arranging a polymer insert in the bundle of monofilaments such that an end surface of the polymer insert and one ends of the monofilaments make up a flush end surface of monofilaments,
   fusing the one ends of the monofilaments-at the end surface together by means of a laser into a joined bundle of monofilaments; and
   fusing the one ends of the bundle of monofilaments to at least a part of the polymer insert.

2. The method of bundling a plurality of monofilaments according to claim 1, wherein the fusing by means of the laser is performed by moving the laser in a predefined-pattern that is configured to distribute the heating of the one ends of the monofilaments equally.

3. The method of bundling a plurality of monofilaments according to claim 1, wherein the fusing by means of the laser is performed by the laser being out of focus at the position of the one ends of the monofilaments.

4. A method of bundling a plurality of monofilaments according to claim 1, further comprising fusing the one ends of the bundle of monofilaments to a polymer bristle carrier.

5. The method of bundling a plurality of monofilaments according to claim 1, further comprising fusing the outer periphery of the end surface of the bundle of monofilaments to the polymer bristle carrier.

6. The method of bundling a plurality of monofilaments according to claim 4, further comprising melting extra material comprised in the polymer bristle carrier such that the extra material make up a fusing area/volume/layer covering at least partly the end surface.

7. A method of bundling a plurality of monofilaments according to claim 1, further comprising fusing the one ends of the bundle of monofilaments to at least a part of a polymer insert.

8. The method of bundling a plurality of monofilaments according to claim 7, further comprising arranging the polymer insert such that a portion of the polymer insert protrudes from the end surface and melting the protruding portion of the polymer insert such that the protruding portion of the polymer insert make up a fusing area/volume/layer covering at least partly the end surface.

9. The method of bundling a plurality of monofilaments according to claim 1, wherein the plurality of monofilaments and/or polymer bristle carrier and/or polymer insert is/are made of polyester.

10. A paint brush head comprising a bundle of monofilaments and a polymer bristle carrier obtained by the method according to claim 1.

11. The paint brush head according to claim 10, wherein the bundle of monofilaments and the polymer bristle carrier are is fused together.

12. The paint brush head according to claim 10, wherein the polymer bristle carrier is detachably attached to a paint brush handle.

13. A paint brush comprising a bundle of monofilaments obtained by the method according to claim 1.

14. The paint brush comprising a paint brush head according to claim 10.

\* \* \* \* \*